United States Patent
Kozuschek et al.

(10) Patent No.: US 8,960,214 B2
(45) Date of Patent: Feb. 24, 2015

(54) TIRE PRESSURE RELEASE APPARATUS AND METHOD

(76) Inventors: Michael A. Kozuschek, San Luis Obispo, CA (US); Christian S. Carlberg, San Luis Obispo, CA (US)

( * ) Notice: Subject to any disclaimer, the term of this patent is extended or adjusted under 35 U.S.C. 154(b) by 230 days.

(21) Appl. No.: 13/046,657

(22) Filed: Mar. 11, 2011

(65) Prior Publication Data

US 2012/0227831 A1    Sep. 13, 2012

(51) Int. Cl.
F16K 15/20 (2006.01)
B60C 29/06 (2006.01)

(52) U.S. Cl.
CPC .............. *F16K 15/20* (2013.01); *B60C 29/064* (2013.04); *B60C 29/068* (2013.04)
USPC .......... 137/15.08; 137/223; 137/231

(58) Field of Classification Search
USPC .............. 137/231, 228, 223, 15.08, 230; 152/415; 285/354
See application file for complete search history.

(56) References Cited

U.S. PATENT DOCUMENTS

| | | | | |
|---|---|---|---|---|
| 938,425 | A * | 10/1909 | Kelly | 285/108 |
| 1,043,294 | A * | 11/1912 | Brinkop | 285/281 |
| 1,209,213 | A * | 12/1916 | Schneider | 137/223 |
| 1,341,828 | A * | 6/1920 | Volckhausen | 137/223 |
| 5,730,177 | A | 3/1998 | Kim | |
| 5,762,095 | A * | 6/1998 | Gapinski et al. | 137/223 |
| 5,785,076 | A * | 7/1998 | You | 137/231 |
| 5,902,097 | A | 5/1999 | Wu | |
| 5,921,269 | A | 7/1999 | Wu | |
| 6,070,855 | A | 6/2000 | Chuang et al. | |
| 6,102,063 | A | 8/2000 | Pierce et al. | |
| 6,260,572 | B1 * | 7/2001 | Wu | 137/231 |
| 6,276,391 | B1 * | 8/2001 | Wu | 137/223 |
| 6,382,268 | B1 * | 5/2002 | Lin | 137/231 |
| 6,805,537 | B2 * | 10/2004 | Wu | 417/63 |
| 6,981,511 | B2 * | 1/2006 | Knowles et al. | 137/614 |
| 7,040,355 | B2 * | 5/2006 | Wu | 137/223 |
| 7,093,609 | B2 | 8/2006 | Chen | |
| 7,963,297 | B2 * | 6/2011 | Huang et al. | 137/231 |
| 8,186,373 | B2 * | 5/2012 | Huang et al. | 137/231 |
| 8,245,722 | B2 * | 8/2012 | Huang et al. | 137/223 |

(Continued)

FOREIGN PATENT DOCUMENTS

| | | |
|---|---|---|
| DE | 3027792 | 2/1982 |
| EP | 2497657 A1 | 9/2012 |
| GB | 273899 | 7/1927 |

OTHER PUBLICATIONS

Prestoflator Owners Manual Sep. 1, 2001 (2 pgs.).
Topeak TV Details; YouTube http://www.topeak.com/pages/368/news/detail/778; copyright@2011 Topeak Inc. (13 pgs.).

(Continued)

*Primary Examiner* — John K Fristoe, Jr.
*Assistant Examiner* — Craig J Price
(74) *Attorney, Agent, or Firm* — Fitch, Even, Tabin & Flannery LLP (57) ABSTRACT

An apparatus includes a housing, a passageway, a pressure release mechanism, and at least one seal. The housing includes a longitudinal axis. The passageway extends through the housing and along the longitudinal axis and has a first end and a second end. The first end is configured to be threadably coupled and to be in fluid communication with a Presta valve of a tire. The second end is configured to be in fluid communication with a hose. The pressure release mechanism communicates with the passageway. The seal communicates with the pressure release mechanism and seals the pressure release mechanism and the passageway.

21 Claims, 9 Drawing Sheets

(56) References Cited

U.S. PATENT DOCUMENTS

2010/0019491 A1* 1/2010 Huang et al. .................. 285/344
2012/0037244 A1* 2/2012 Ostrowiecki .................. 137/231

OTHER PUBLICATIONS

Extended European Search Report for 11177961.7 mailed from the European Patent Office on Feb. 16 2012.

* cited by examiner

TIRE PRESSURE RELEASE APPARATUS AND METHOD

FIELD OF THE INVENTION

The field of the invention relates to pumping arrangements for tires and, more specifically, to removing these arrangements after tire inflation.

BACKGROUND OF THE INVENTION

Over the years, various types of valves have been used for tires on bicycles. One of these types of arrangements is a Presta-type (or French) valve. The Presta-type valve includes a long stem to which a hose from a pump may be connected. The pump may then be used to inflate the tire. The Presta-type valve includes a valve core, which may be unscrewed. The Presta-type valve also includes an internal valve such that once inflation of the tire is complete, the internal valve closes preventing the tire from deflating.

Although the Presta-type valve may be preferred in some applications, one problem concerning this valve involves the valve core. The valve core is typically installed at the factory. Sometimes, the valve core is not secured very tightly to the rest of the valve by the factory and is loose. At other times, the valve core may loosen due to use of the tire. When the valve core is loose or is otherwise not secured, a user may still desire to thread a pumping apparatus to the valve in order to inflate the tire. After the tire has been inflated, the user typically wishes to remove the tire pump.

Unfortunately, after the tire is inflated pressure still exists in the hose of the pump. Pressure also exists in the tire, up to the internal valve of the Presta-type valve. These pressures may cause stiction to occur between the valve core and portions of the hose. If this occurs, as the pump is unthreaded, the valve core may be removed with the pump. Needless to say, this occurrence is inconvenient for the user since they now have to re-attach or re-insert the valve core. In other circumstances, the valve core may become de-attached and the valve core may become lost. The detachment often occurs at inconvenient times or places.

All of these problems have made it sometimes inconvenient for users to inflate their tires, and utilize and enjoy their bicycle. This, in turn results in user dissatisfaction with current pumping arrangements.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

As described herein, approaches are provided that allow coupling of a hose of a pumping arrangement to a tire valve (e.g., a Presta-type valve) and for pressure to be released from the hose after the tire is inflated. In so doing, the pumping arrangement may be decoupled from the tire valve without detaching portions of the tire valve (e.g., without detaching the valve core of a Presta-type valve). In cases where a swivel cup is provided (e.g., that is used to turn the apparatus without having to turn the hose), the swivel cup can be easily turned after the pressure is released allowing easy detachment of the pumping mechanism from the tire valve. Consequently, since portions of the tire valve are not detached upon removal of a pumping arrangement, and/or a swivel cup can be easily turned to remove the pumping arrangement, user satisfaction with the system is increased.

In many of these embodiments, an apparatus includes a housing, a passageway, a pressure release mechanism, and at least one seal. The housing defines a longitudinal axis. The passageway extends through the housing and along the longitudinal axis. The passageway has a first end and a second end. The first end is configured to be threadably coupled and to be in fluid communication with a Presta-type valve of a tire (e.g., a bicycle tire). The second end is configured to be in fluid communication with a hose.

The pressure release mechanism communicates with the passageway. The seal communicates with the pressure release mechanism and seals the pressure release mechanism and the passageway. The seal is effective to prevent air pressure from escaping the passageway when the pressure release mechanism is not actuated. Actuation of the pressure release mechanism is effective to release pressure from the hose to the exterior of the apparatus and prevent detachment of any portion of the Presta-type valve (e.g., a valve core) as the apparatus is removed from the Presta-type valve.

In some aspects, the pressure release mechanism comprises a button, a button cap and a spring. The spring is disposed in the button cap and biases the button. The pressure release mechanism is disposed in an opening that extends completely through the housing. When the button is pressed or actuated, a seal is created between the pressure release mechanism and apparatus. As the button is pushed, the seal is broken and pressure from the hose is released.

In other aspects, the apparatus is coupled to a swivel cup. When pressure exists in the hose, the swivel cup is substantially not turnable by a user (and it is difficult or impossible to turn the apparatus), and when pressure is released from the hose, the swivel cup is turnable by the user (and it is easy to turn the apparatus and release it).

In others of these embodiments, an apparatus for attaching a hose of an air pump to a Presta-type valve on a tire includes a housing and a pressure release mechanism. The housing includes a first passageway and the first passageway extends along a longitudinal axis of the apparatus and there-through. The first passageway has a first end and a second end. The first end is threaded and configured to receive a threaded core portion of a Presta-type valve. The second end of the passageway is configured to be in fluid communication with the hose of the pump.

The housing also forms a second passageway that extends generally in a direction perpendicular to the longitudinal axis and through the housing. The second passageway is in fluid communication with the first passageway and is configured to receive the pressure release mechanism which is operable to traverse at least some portions of the second passageway. Selective movement of the pressure release mechanism through the second passageway is effective to allow pressure in the hose to flow from the hose to the exterior of the apparatus via the second passageway and allow detachment of the apparatus from the Presta-type valve without detaching the core portion of the Presta-type valve from the remainder of the Presta-type valve.

In other aspects, the apparatus further includes a swivel cup that is coupled to the housing that is configured to turn the apparatus and allow attachment to the Presta-type valve. When pressure exists in the hose, the swivel cup is substantially not turnable by a user, and when pressure is released from the hose, the swivel cup is turnable by the user.

In other aspects, the button apparatus includes a threaded cap portion that is screwed into the second passageway. In some aspects, the button apparatus includes a spring and a button, and the spring provides a tension against the button cap and pushes the button against the housing to seal an O-ring.

In others of these embodiments, the core portion of a Presta-type valve is threaded into a connection apparatus and the connection apparatus is coupled to the hose of an air pump. Pressure is pumped through the hose and the connection apparatus into the tire via the core portion of the Presta-type valve. After the tire is inflated, pressure is released from the hose to the exterior of the hose while still maintaining air pressure in the tire. The connection apparatus is then unthreaded from the Presta-type valve without detaching the core portion of the Presta-type valve from the remainder of the Presta-type valve.

In some other aspects, a swivel cup is provided to allow attachment of the hose to the Presta-type valve. When pressure exists in the hose, the swivel cup is substantially not turnable by a user, and when pressure is released from the hose, the swivel cup is turnable by the user.

In some aspects, a pressure gage is coupled to the hose and the pressure of the tire is measured. In other aspects, the pumping is made to a predetermined limit.

As used herein, the term "Presta-type" apparatus or valve, or "Presta compatible" apparatus or valve refers to a Presta valve arrangement as is well known to those skilled in the art that includes a stem to which a hose from a pump may be connected. The Presta valve includes a valve core (which is the stem or is part of the stem), which may be detachable, through which air flows from the pump to the tire. The Presta valve further includes an internal valve that opens after being inflated and such that once inflation is completed, the internal valve closes preventing the tire from deflating. Further, the pumping arrangements or pumps described herein may be of any type such as floor pumps or hand pumps. Still further, the term "pressure" as used herein refers to air pressure.

Although the approaches described herein often relate to Presta-type devices, it will be appreciated that the present approaches are not limited to these type of devices. For example, they apply to variations of Presta-type devices or other types of devices (e.g., Schrader valves). In other words, benefits of the present approaches may be obtained even when a Presta-type valve is not used.

Further, although the Presta-type valves described herein relate especially to and are used with bicycle tires, it will be understood that the valves described herein are not limited to bicycle tires and that these approaches may be used with any type of tire.

Figure 1:
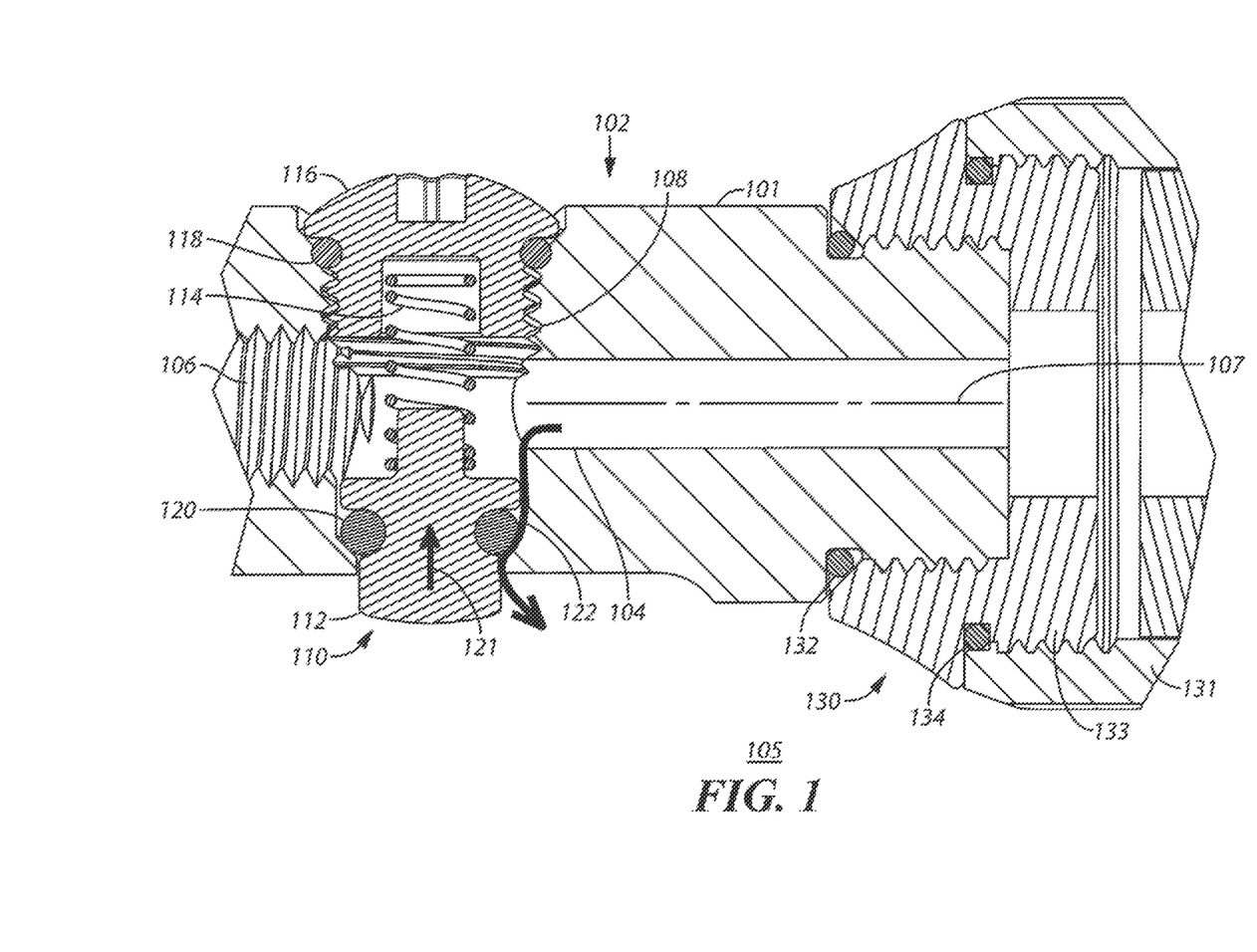
FIG. 1 comprises a cross-sectional view of an apparatus for coupling a pump to a tire valve according to various embodiments of the present invention.

Referring now to FIG. 1, one example of an arrangement for coupling a hose of a pumping arrangement to a valve is described. A connection apparatus or chuck 102 includes a housing 101 with a first passageway 104 that extends through the housing 101 and along a longitudinal axis 107. A threaded portion 106 of the passageway 104 of the housing 101 allows reception of a threaded core portion of a Presta-type valve (not shown in FIG. 1). Alternatively, a non-threaded core portion may be used.

A second passageway 108 extends through the housing 101 and is disposed and formed along an axis that is in a direction generally perpendicular to axis 107 of the first passageway 104. The connection apparatus or chuck 102 is threadably connected to a swivel cup 130. The swivel cup 130 has portions 131 and 133 that are threadably coupled together. The swivel cup 130 is configured to allow turning of the apparatus 102 without turning the hose of the pump.

A pressure release mechanism 110 is disposed in the second passageway 108. The pressure release mechanism 110 includes a button 112, a spring 114, a threaded cap 116, an upper O-ring seal 118, and a lower O-ring seal 120. In pumping or inflation operations, the seals 118 and 120 prevent pressure from exiting the first passageway 104 to the exterior 105 of the apparatus. When the button 112 is pushed inwardly in the direction of the arrow labeled 121, the seal 120 is broken (e.g., the O-ring is slightly deformed creating a small space or opening between the O-ring and the body 101) allowing pressure to escape from the first passageway 104 to the exterior 105 of the apparatus 102 in the direction of the arrow labeled 122. The amount of seal breakage can be very small, for example, a separation distance of much less than 1 mm. Once the pressure is released, the apparatus 102 may be detached from the Presta-type valve without detaching the valve core from the Presta-type valve, for example, by turning the swivel cup 130.

The O-rings may be constructed of any suitable flexible material such as rubber. The housing 101 may be constructed of any suitable strong or resilient material such as aluminum. Portions of the release mechanism 110 may be constructed of plastic. It will be appreciated that other types of materials may also be used to construct these elements.

In operation, a hose sends pressure through the passageway 104 to the tire after the Presta-type core is threadably engaged to threads 106. Actuation of the pressure release mechanism 110 is effective to release pressure from the hose to the exterior 105 of the apparatus 102 and prevent detachment of any portion of the Presta-type valve (e.g., the core) as the apparatus 102 is removed from the Presta-type valve, for example, by turning the swivel cup.

Figure 2A:
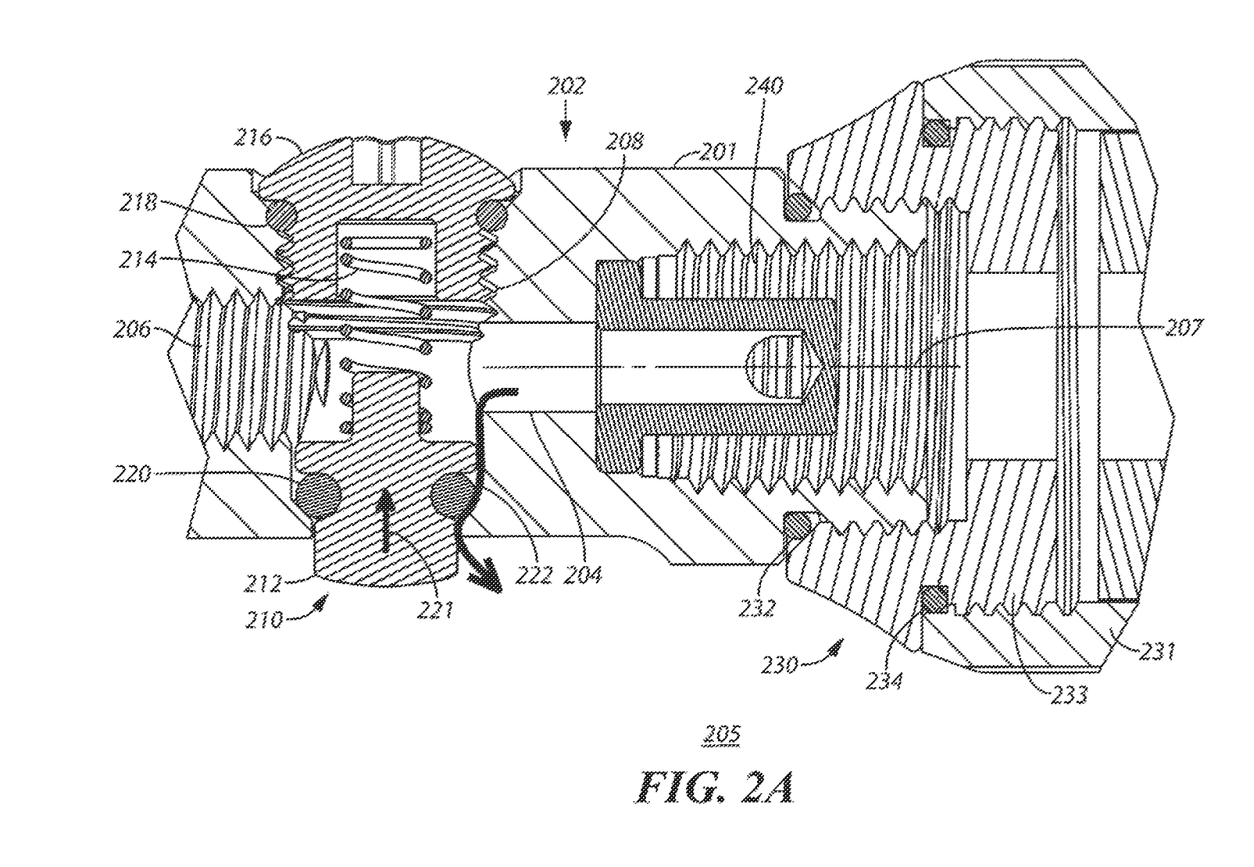
FIGS. 2A-C comprise views, including cross-sectional views, of a flip chuck apparatus for coupling a tire valve to a pump according to various embodiments of the present invention.
Figure 2B:
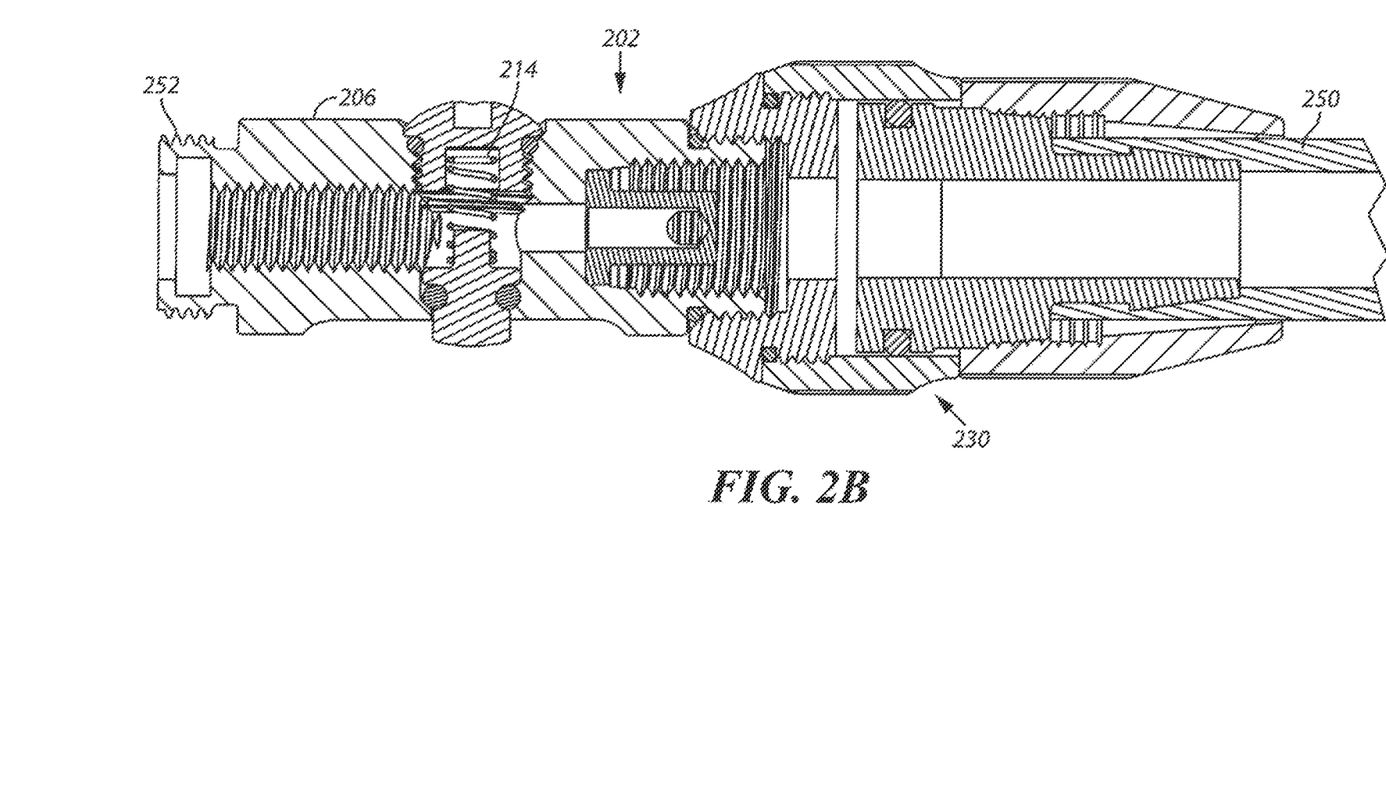
Figure 2C:
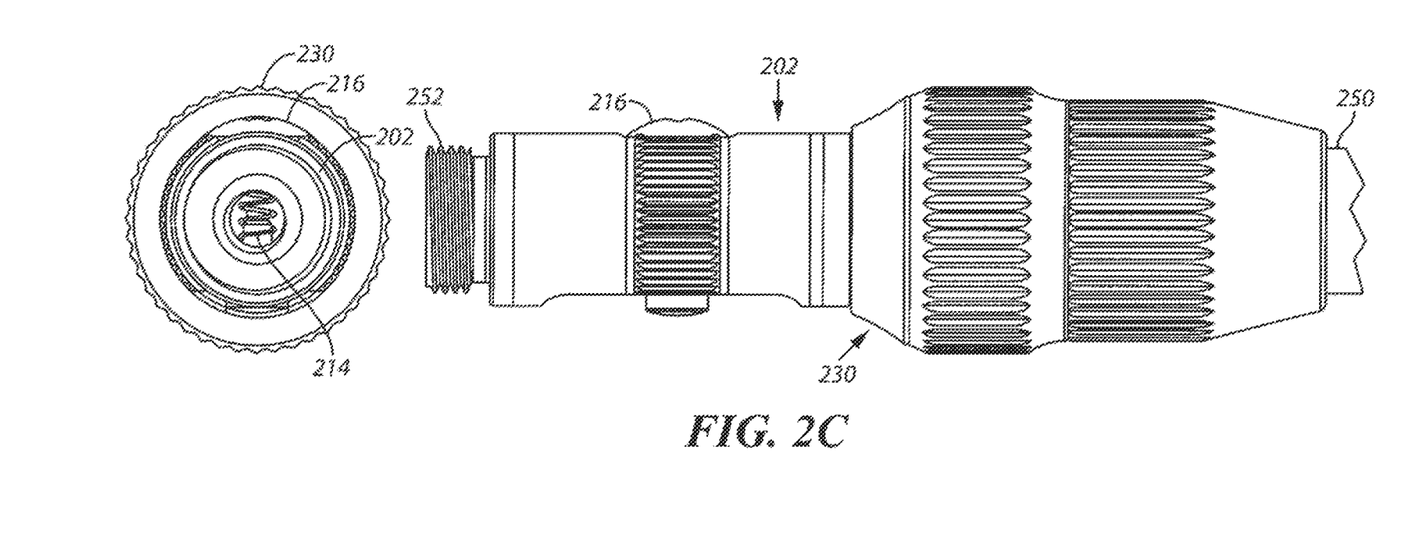

Referring now to FIGS. 2A-C, another example of an arrangement that couples a tire valve to a pump is described. A connection apparatus or chuck 202 includes a housing 201 with a first passageway 204 that extends through the housing 201 and is disposed along a longitudinal axis 207. A threaded portion 206 of the passageway 204 of the housing 201 allows reception of a threaded core portion of a Presta-type valve (not shown in FIG. 2). A second passageway 208 extends through the housing 201 along an axis that is in a direction generally perpendicular to the first passageway 204. The connection apparatus 202 is threadably connected to a swivel cup 230. The swivel cup 230 has portions 231 and 233 that are threadably coupled together. The swivel cup 230 is configured to allow turning of the apparatus 202 without turning the hose of the pump.

A pressure release mechanism 210 is disposed in the second passageway 208. The pressure release mechanism 210 includes a button 212, a spring 214, a threaded cap 216, an upper O-ring seal 218, and a lower O-ring seal 220. In pumping or inflation operations, the seals 218 and 220 prevent pressure from exiting the first passageway 204 to the exterior of the apparatus. When the button 212 is pushed inwardly in a direction indicated by an arrow labeled 221, the seal 220 is broken allowing pressure to escape from the first passageway 204 to the exterior 205 in the direction of the arrow labeled 222. Once the pressure is released, the apparatus 202 may be detached from the Presta-type valve without detaching the valve core from the Presta-type valve.

In the example of FIGS. 2A-C, the apparatus 202 is a "flip" chuck and includes a portion 240 for receiving a valve having a Schrader connection. One end of the apparatus 202 is connected to the swivel cup (which couples to the hose and pump) and the other to the tire valve. As configured in FIG. 2, pressure flows from a hose 250 through the portion 240 then through passageway 204 to the tire. However, it will be understood that the apparatus can be flipped around and used in the opposite direction. In this opposite direction the Schrader portion 240 receives a Schrader valve, pressure flows from the pump through portion 206 of the passageway 204, and then through the Schrader portion 240 and the tire valve, and, finally, into the tire. Thus, the apparatus of FIG. 2 is compatible with valves of two differing types and configurations. The body 201 has threads 252 that allow connection to the swivel cup 230 when the apparatus 202 is flipped.

The O-rings may be constructed of any suitable flexible material such as rubber. The housing 201 may be constructed of a suitable strong or resilient material such as aluminum. Portions of the pressure release mechanism 210 may be constructed of plastic. It will be appreciated that other types of materials may also be used to construct these elements.

In operation, pressure is sent through the hose, then through the passageway 204 to the tire after the Presta-type core is threadably engaged to threads 206. Actuation of the pressure release mechanism 210 is effective to release pressure from the hose to the exterior of the apparatus 202 and prevent detachment of any portion of the Presta-type valve (e.g., the core) as the apparatus 202 is removed from the Presta-type valve, for example, by turning the swivel cup 230.

Figure 3A:
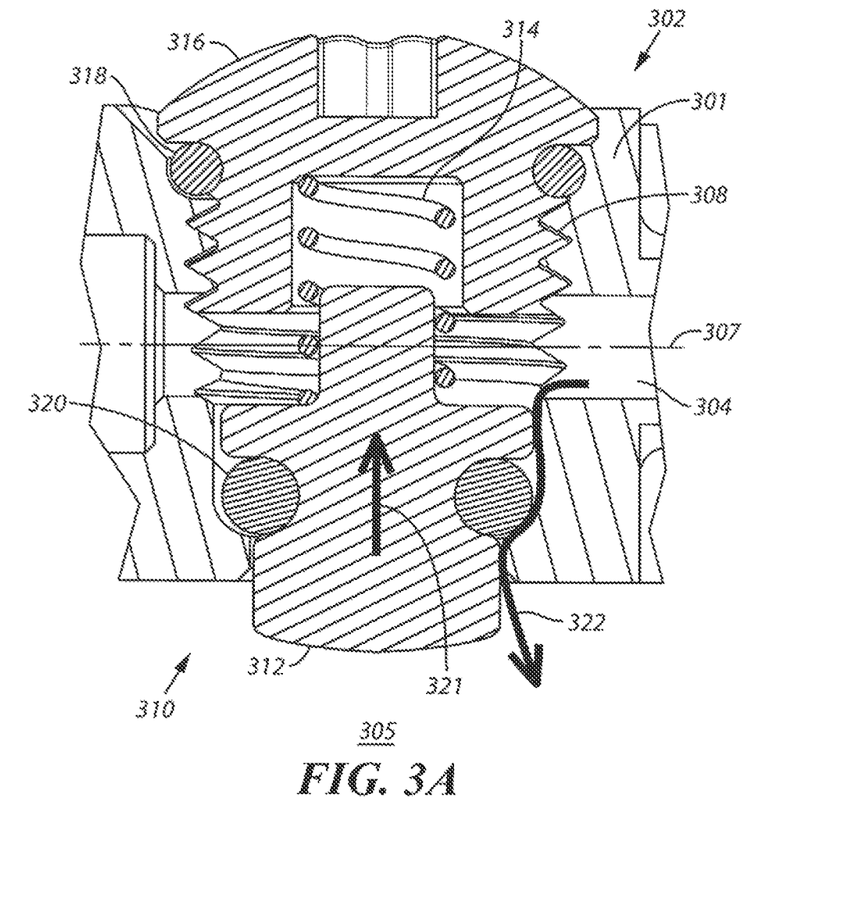
FIGS. 3A-C comprise views, including cross-sectional views, of a mini hose apparatus for coupling a tire valve to a hand pump according to various embodiments of the present invention.
Figure 3B:
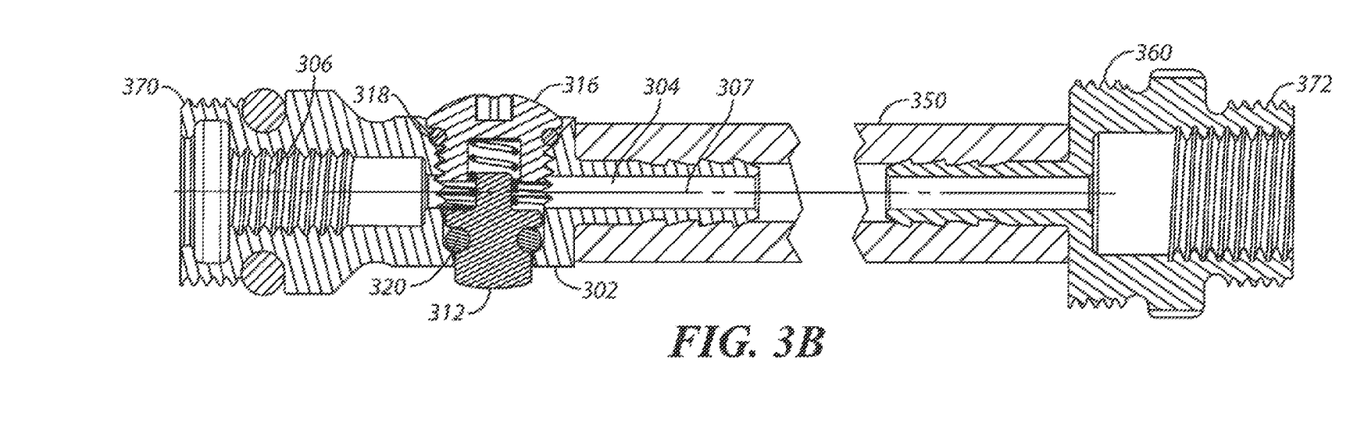
Figure 3C:
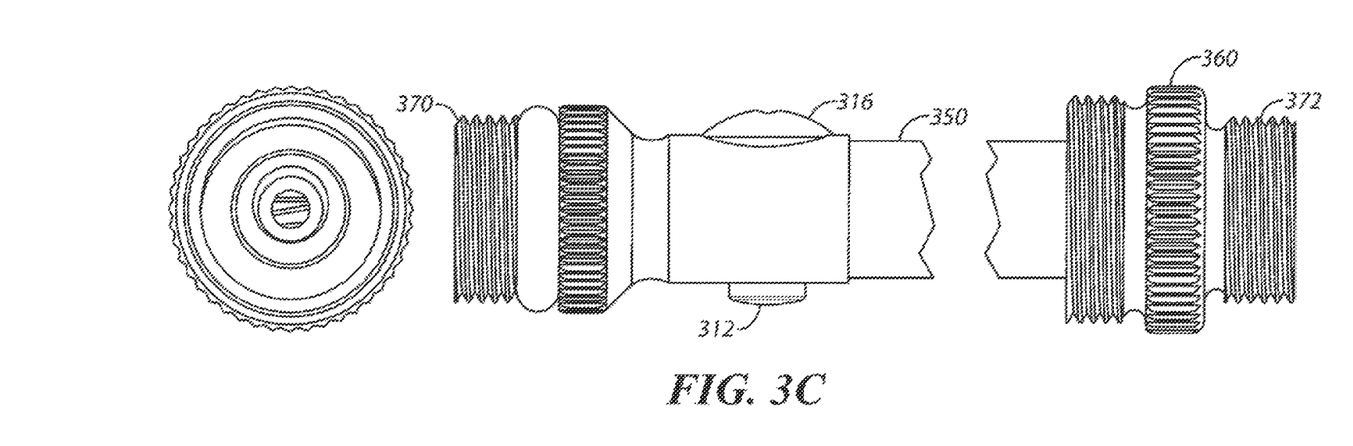

Referring now to FIGS. 3A-3C, another example of an arrangement for coupling to a valve to a pump is described. A connection apparatus or chuck 302 includes a housing 301 with a first passageway 304 that extends through the housing 301 and along a longitudinal axis 307. A threaded portion 306 of the passageway 304 of the housing 301 allows reception of a threaded core portion of a Presta-type valve (not shown in FIG. 3). A second passageway 308 extends through the housing 301 in a direction generally perpendicular to the first passageway 304.

A pressure release mechanism 310 is disposed in the second passageway 308. The pressure release mechanism 310 includes a button 312, a spring 314, a threaded cap 316, an upper O-ring seal 318, and a lower O-ring seal 320. In pumping or inflation operations, the seals 318 and 320 prevent pressure from exiting the first passageway 304 to the exterior of the apparatus. When the button 312 is pushed inwardly in a direction indicated by an arrow labeled 321, the seal 320 is broken allowing pressure to escape from the first passageway 304 to the exterior in the direction of the arrow labeled 322. Once the pressure is released, the apparatus 302 may be detached from the Presta-type valve without detaching the valve core from the Presta-type valve.

A hose 350 extends from the apparatus 302 to a Schrader connection 360. The structure of a Schrader connector is well know to those skilled in the art and will be described no further herein. The Schrader connection 360 may be coupled to a pump. Thus, pressure flows from the pump through the hose 350, through the apparatus 302, and then to the tire. This arrangement can also be reversed. In this case, apparatus 302 is coupled to the pump and Schrader connection 360 to the tire. Then, pressure flows from the pump through the hose 350, through the apparatus 302, through the Schrader connection 360, and then to the tire. Threads 370 and 372 formed on the housing 301 provide a connection to the pump for the alternate ends of the apparatus 302.

The O-rings may be constructed of any suitable flexible material such as rubber. The housing 301 may be constructed of a suitable strong or resilient material such as aluminum. Portions of the pressure release mechanism 310 may be constructed of plastic. It will be appreciated that other types of materials may also be used to construct these elements.

In operation, pressure is sent through the hose, then through the passageway to the tire after the Presta-type core is threadable engaged to threads 306. Actuation of the pressure release mechanism 310 is effective to release pressure from the hose 350 to the exterior 305 of the apparatus 302 and prevent detachment of any portion of the Presta-type valve (e.g., the core) as the apparatus 302 is removed from the Presta-type valve.

Figure 4A:
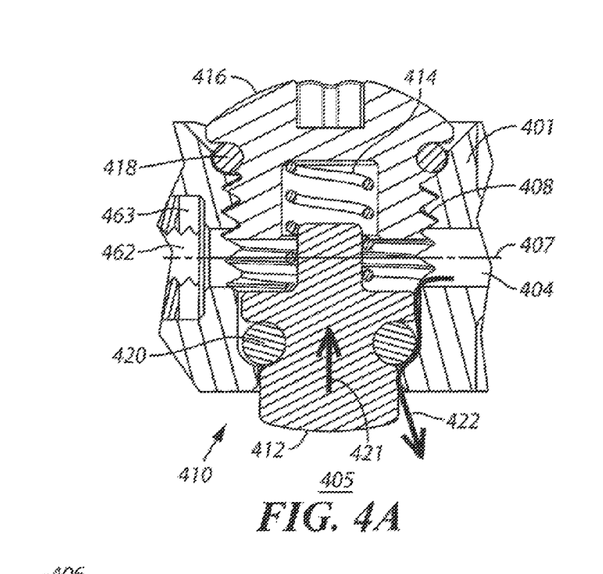
FIGS. 4A-C comprise views, including cross-sectional views, of a mini hose apparatus for coupling a tire valve to a hand pump with a Presta-type valve inserted at one end of the apparatus according to various embodiments of the present invention.
Figure 4B:
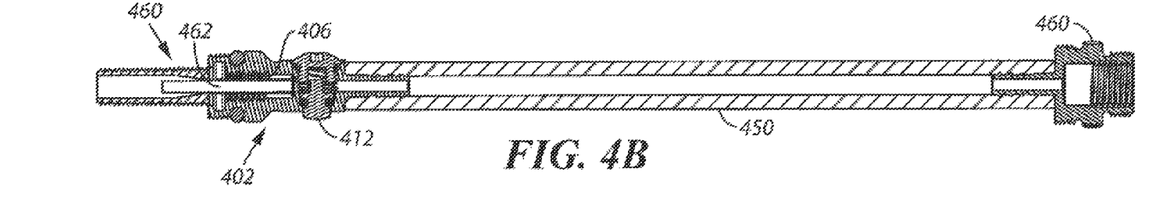
Figure 4C:
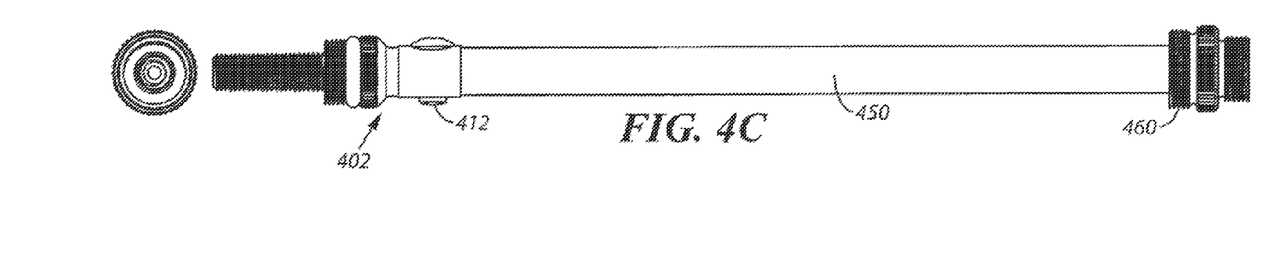

Referring now to FIGS. 4A-4C, another example of an arrangement for coupling to a valve is described. A connection apparatus or chuck 402 includes a housing 401 with a first passageway 404 that extends through the housing 401 and along a longitudinal axis 407. A threaded portion 406 of the passageway 404 of the housing 401 allows reception of a threaded core portion of a Presta-type valve 460. The valve 460 includes a core portion 462 that engages threads 463 of the threaded portion 406 of the housing 401. A second passageway 408 extends through the housing 401 in a direction generally perpendicular to the first passageway 404.

A pressure release mechanism 410 is disposed in the second passageway 408. The pressure release mechanism 410 includes a button 412, a spring 414, a threaded cap 416, an upper O-ring seal 418, and a lower O-ring seal 420. In pumping or inflation operations, the seals 418 and 420 prevent pressure from exiting the first passageway 404 to the exterior of the apparatus. When the button 412 is pushed inwardly in the direction indicated by the arrow labeled 421, the seal 420 is broken allowing pressure to escape from the first passageway 404 to the exterior 405 in the direction of the arrow labeled 422. Once the pressure is released, the apparatus 402 may be detached from the Presta-type valve without detaching the valve core from the Presta-type valve.

A hose 450 extends from the apparatus 402 to a Schrader connection 460. The Schrader connection 460 may be coupled to a pump. Thus, pressure flows from the pump through the hose 450, through the apparatus 402 and then to the tire. This configuration can also be reversed. In this case, apparatus 402 is coupled to the pump and Schrader connection 460 is coupled to the tire valve. Then, pressure flows from the pump through the hose 450, through the apparatus 402, through the Schrader connection 460, and then to the tire.

The O-rings may be constructed of any suitable flexible material such as rubber. The housing 401 may be constructed of a suitable strong or resilient material such as aluminum. Portions of the release mechanism 410 may be constructed of plastic. It will be appreciated that other types of materials may also be used to construct these elements.

In operation, abuse sends pressure through the passageway 404 into the tire after the Presta-type core is threadably engaged to threads 406. Actuation of the pressure release mechanism 410 is effective to release pressure from the hose to the exterior of the apparatus 402 and prevent detachment of any portion of the Presta-type valve (e.g., the core) as the apparatus 402 is removed from the Presta-type valve.

Figure 5:
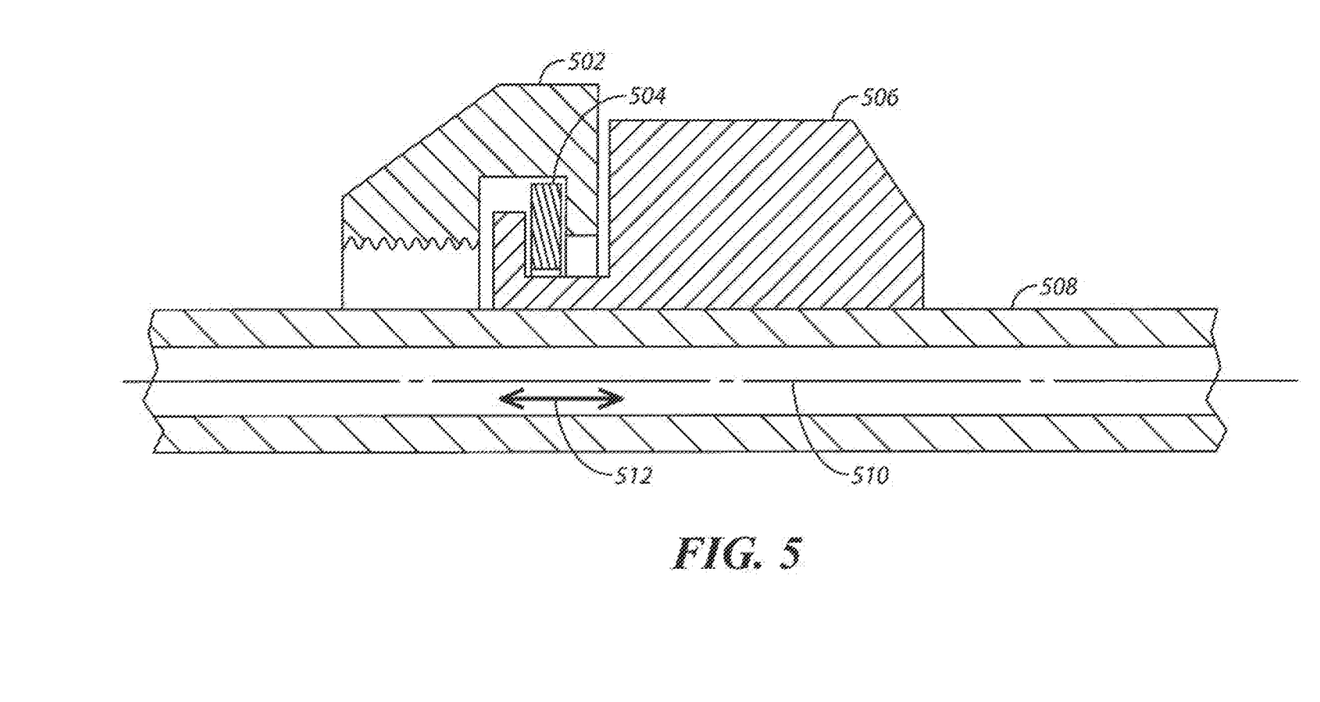
FIG. 5 is a cutaway view of an apparatus including a swivel cup according to various embodiments of the present invention.

Referring now to FIG. 5, a swivel cup arrangement is described. An element 504 (e.g., made of rubber) is disposed between a swivel cup 502 and a housing 506. One purpose of the element 504 is to provide a seal. The housing 506 is coupled to a hose 508 having a center line or axis 510. Pressure 512 builds up in the hose 508 as the tire is inflated. Consequently, the pressure 512, acts to separate the elements as indicated by the direction of arrow 512. This makes the swivel cup 502 unturnable or only turnable with great physical force since the cup 502 and the housing 504 are forced together. Since the pressure is released by the pressure relief valve according to the present approaches, the swivel cup 502 can then turn and the apparatus can then be detached from the tire valve of the tire.

Figure 6:
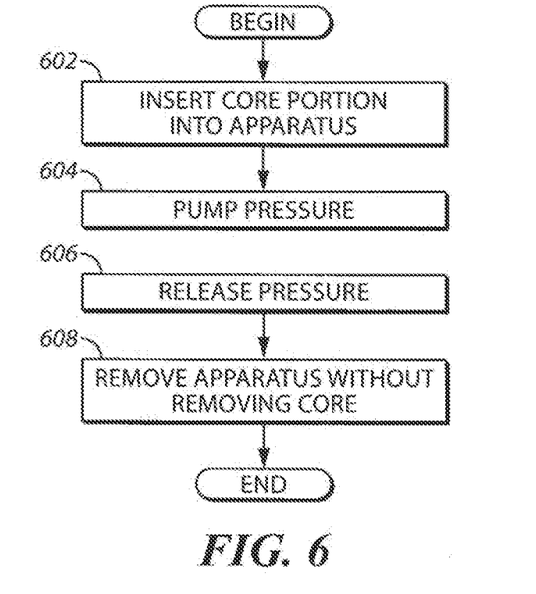
FIG. 6 is a flowchart of an approach for removing inflation device without removing the tip according to various embodiments of the present invention.

Referring now to FIG. 6, one approach for inflating a tire and removing the pump is described. At step 602, the core portion of a Presta-type valve is inserted (e.g., threaded) into a connection apparatus and the connection apparatus is coupled to the hose of an air pump. The connection of the core portion to the apparatus may be made by a threaded connection.

At step 604, pressure is pumped through the hose and the connection apparatus into the tire via the core portion of the Presta-type valve. The pump may be a hand pump or a floor pump.

At step 606, after the tire is inflated, pressure is released from the hose to the exterior of the hose while maintaining air pressure in the tire. This may be accomplished as described herein by use of a pressure release assembly that is actuated by the pressing of a button. Although described herein as using a button, it will be appreciated that other actuators (e.g., screws, knobs, switches and so forth) may also be used.

At step 608, the connection apparatus is then removed or separated (e.g., unthreaded) from the Presta-type valve of the tire without detaching the core portion of the Presta-type valve from the Presta-type valve. This can be accomplished since the pressure in the hose is released and stiction of the valve core to portions of the apparatus is significantly reduced or eliminated.

In some examples, a swivel cup is provided to allow attachment of the hose to the Presta-type valve (e.g., by turning the swivel cup). When pressure exists in the hose, the swivel cup is substantially not turnable by a user. However, when pressure is released from the hose, the swivel cup is turnable by the user.

In other examples, a pressure gage may be coupled to the hose and used to measure the pressure of the tire. In other aspects, the tire is inflated to a predetermined pressure limit.

Figure 7:
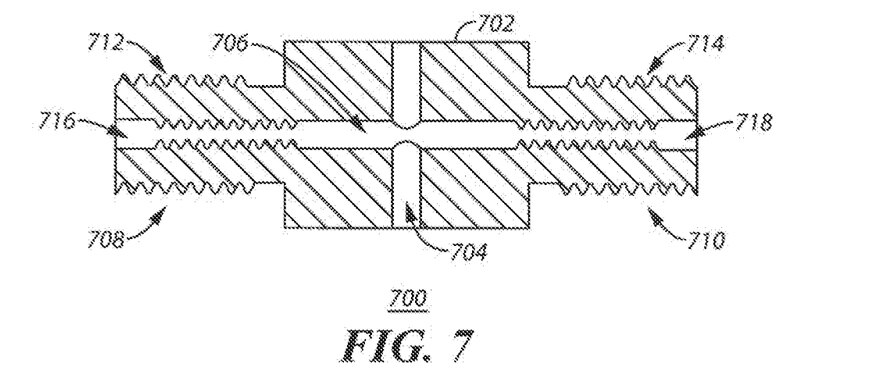
FIG. 7 is a cutaway diagram of a flip-chuck showing various connections according to embodiments of the present invention.

Referring now to FIG. 7, one example of a flip-chuck 700 is described. The chuck body 702 has a first passageway 706 that extends through the body 702. The chuck body 702 also includes a pressure release passageway 704, in which a pressure release mechanism as been described herein is disposed. A first end 708 communicates with a Schrader valve and a second end 710 communicates with a Presta-type valve. External threads 712 and 714 communicate with a hose. Internal threads 716 communicate with Schrader valve and internal threads 718 communicate with a Presta valve.

In one arrangement, the threads 712 are connected to a hose while the threads 718 are connected to a Presta valve. In another arrangement, the chuck 700 is flipped and the threads 716 are connected to the hose, while the threads 716 are coupled to a Schrader valve. The operation of the pressure release mechanism is the same as has been described elsewhere in this application.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. An apparatus comprising;
   a housing with a longitudinal axis;
   a passageway extending through the housing and along the longitudinal axis, the passageway having a first end and a second end, the first end configured to be threadably coupled and to be in fluid communication with a Presta valve of a tire such that an internal valve of the Presta valve prevents air from escaping from the tire while the first end is threadably coupled to the Presta valve, the second end being configured to be in fluid communication with a hose;
   a pressure release mechanism communicating with the passageway;
   at least one seal that communicates with the pressure release mechanism and seals the pressure release mechanism and the passageway, the at least one seat effective to prevent pressure from escaping the passageway when the pressure release mechanism is not actuated;
   such that actuation of the pressure release mechanism while the first end is threadably coupled to the Presta valve is effective to release pressure from the hose to an exterior of the apparatus while the internal valve of the Presta valve prevents air from escaping from the tire through the Presta valve, and to prevent detachment of any portion of the Presta valve as the apparatus is removed from the Presta valve.

2. The apparatus of claim 1 wherein the pressure release mechanism comprises a button.

3. The apparatus of claim 2 wherein the pressure release mechanism further comprises a button cap and a spring and wherein the button is biased away from the button cap via the spring.

4. The apparatus of claim 3 wherein the pressure release mechanism is disposed in an opening that extends completely through the housing.

5. The apparatus of claim 1, wherein at least a portion of the Presta valve is located within the housing when the first end is threadably coupled to the Presta valve.

6. The apparatus of claim 1, wherein the housing includes an exterior threaded surface adapted to permit a swivel cup to be threadably coupled to the housing.

7. The apparatus of claim 6, further comprising the swivel cup threadably coupled to the exterior threaded surface of the housing, the swivel cup including a first portion and a second portion threadably attached to the first portion, the swivel cup being configured to permit rotation of the housing without corresponding rotation of the hose of an air pump coupled to the housing.

8. The apparatus of claim 7, wherein the swivel cup is threadably coupled to the exterior threaded surface of the housing such that the swivel cup is prevented from rotation prior to the actuation of the pressure release mechanism, but is permitted to rotate after actuation of the pressure release mechanism and the release of pressure from the hose to the exterior of the apparatus.

9. An apparatus for at ac ing a hose of an air pump to a Presta valve on a tire, the apparatus comprising:
a housing that includes a first passageway, the first passageway extending along a longitudinal axis of the apparatus and there-through, the first passageway having a first end and a second end, the first end being threaded and configured to receive a threaded core portion of a Presta valve such that an internal valve of the Presta valve prevents air from escaping from the tire while the first end is threadably coupled to the threaded core portion of the Presta valve, the second end of the passageway configured to be in fluid communication with the hose of the pump;
a pressure release mechanism;
such that the housing forms a second passageway that extends generally in a direction perpendicular to the longitudinal axis and through the housing, the second passageway being in fluid communication with the first passageway, the second passageway configured to receive the pressure release mechanism which is operable to traverse at least some portions of the second passageway;
such that selective movement of the pressure release mechanism through the second passageway while the first end is threadably coupled to the threaded core portion of the Presta valve is effective to allow pressure in the hose to flow from the hose to an exterior of the apparatus via the second passageway while the internal valve of the Presta valve prevents air from escaping from the tire through the Presta valve, and to allow detachment of the apparatus from the Presta valve without detaching the core portion of the Presta valve from the Presta valve.

10. The apparatus of claim 9 further comprising a swivel cup coupled to the housing such that the swivel cup is configured to turn the apparatus and allow attachment to the Presta valve.

11. The apparatus of claim 10 wherein when pressure exists in the hose, the swivel cup is substantially not turnable by a user, and when pressure is released from the hose, the swivel cup is turnable by the user.

12. The apparatus of claim 9 further comprising a button apparatus and wherein the button apparatus includes a threaded cap portion that is screwed into the second passageway.

13. The apparatus of claim 12 wherein the button apparatus includes a spring and a button, the spring providing a tension against the threaded cap portion.

14. A method of removing all inflation device from a tire valve, the method comprising,
threading a core portion of a Presta valve connection into a connection apparatus such that an internal valve of the Presta valve prevents air from escaping from the tire while the first end is threadably coupled to the core portion of the Presta valve, the connection apparatus coupled to a hose of an air pump;
pumping pressure through the hose and the connection apparatus into a tire via the core portion of the Presta valve;
when the tire is inflated, releasing pressure from a hose to an exterior of the hose while the first end of the connection apparatus is threadably coupled to the threaded core portion of the Presta valve and while the internal valve of the Presta valve prevents air from escaping from the tire through the Presta valve;
unthreading the connection apparatus from the Presta valve without detaching the core portion of the Presta valve from the Presta valve.

15. The method of claim 14 further comprising providing a swivel cup to allow attachment of the hose to the Presta valve, and wherein when pressure exists in the hose, the swivel cup is substantially not turnable by a user, and when pressure is released from the hose, the swivel cup is turnable by the user.

16. The method of claim 14 further comprising attaching a pressure gage to the hose and measuring the pressure of the tire.

17. An apparatus comprising;
a housing with a longitudinal axis;
a passageway extending through the housing and along the longitudinal axis, the passageway having a first end and a second end, the first end configurable to be coupled to and to be in fluid communication with a Presta valve of a tire such that an internal valve of the Presta valve prevents air from escaping from the tire while the first end is threadably coupled to the Presta valve, the second end being configured to be in fluid communication with a hose;
a pressure release mechanism communicating with the passageway;
at least one seal that communicates with the pressure release mechanism and seals the pressure release mechanism and die passageway, the at least one seal effective to prevent pressure from escaping the passageway when the pressure release mechanism is not actuated;
such that actuation of the pressure release mechanism is effective to release pressure from the hose to an exterior of the apparatus while the internal valve of the Presta valve prevents air from escaping from the tire through the Presta valve, and to prevent detachment of any portion of the Presta valve as the apparatus is removed from the Presta valve, while preventing air pressure from escaping from the tire through the Presta valve.

18. The apparatus of claim 17 wherein the first end has grooves formed therein and the grooves comprise threads.

19. The apparatus of claim 17 wherein the pressure release mechanism comprises a button.

20. The apparatus of claim 19 wherein the pressure release mechanism further comprises a button cap and a spring and wherein the button is biased away from the button cap via the spring.

21. The apparatus of claim 20 wherein the pressure release mechanism is disposed in an opening that extends completely through the housing.

* * * * *

UNITED STATES PATENT AND TRADEMARK OFFICE
CERTIFICATE OF CORRECTION

PATENT NO. : 8,960,214 B2  
APPLICATION NO. : 13/046657  
DATED : February 24, 2015  
INVENTOR(S) : Kozuschek Page 1 of 1

It is certified that error appears in the above-identified patent and that said Letters Patent is hereby corrected as shown below:

On the TITLE PAGE:
  Item (56) Other Publications, line 1, delete "Prestoflator" and insert --Prestaflator--.

In the CLAIMS:
  Claim 1, column 8, line 47, delete "seat" and insert --seal--.
  Claim 9, column 9, line 22, delete "at ac ing" and insert --attaching--.
  Claim 14, column 10, line 4, delete "all" and insert --an--.
  Claim 17, column 10, line 48, delete "die" and insert --the--.

Signed and Sealed this
Fourteenth Day of July, 2015

Michelle K. Lee
*Director of the United States Patent and Trademark Office*